United States Patent
Terashita

(10) Patent No.: US 10,120,629 B2
(45) Date of Patent: Nov. 6, 2018

(54) PRINTING DEVICES AND TERMINAL DEVICES THAT SWITCH COMMUNICATION MODES

(71) Applicant: BROTHER KOGYO KABUSHIKI KAISHA, Nagoya-shi, Aichi-ken (JP)

(72) Inventor: Kunihito Terashita, Nagoya (JP)

(73) Assignee: BROTHER KOGYO KABUSHIKI KAISHA, Nagoya-Shi, Aichi-ken (JP)

( * ) Notice: Subject to any disclaimer, the term of this patent is extended or adjusted under 35 U.S.C. 154(b) by 83 days.

(21) Appl. No.: 14/271,747

(22) Filed: May 7, 2014

(65) Prior Publication Data
US 2014/0240782 A1 Aug. 28, 2014

Related U.S. Application Data

(63) Continuation of application No. 13/299,049, filed on Nov. 17, 2011, now Pat. No. 8,755,071.

(30) Foreign Application Priority Data

Nov. 19, 2010 (JP) .................................. 2010-259305

(51) Int. Cl.
*G06F 3/12* (2006.01)
*H04W 84/18* (2009.01)
*H04W 76/23* (2018.01)

(52) U.S. Cl.
CPC .......... *G06F 3/1292* (2013.01); *G06F 3/1203* (2013.01); *G06F 3/1236* (2013.01);
(Continued)

(58) Field of Classification Search
CPC .... G06F 3/1292; G06F 3/1203; G06F 3/1285; G06F 3/1236; G06F 3/1226; G06F 3/122; G06F 3/1284; H04W 84/18; H04W 76/043
(Continued)

(56) References Cited

U.S. PATENT DOCUMENTS 6,301,016 B1 * 10/2001 Matsueda .......... H04N 1/00209
358/407
6,693,875 B1 * 2/2004 Matsubara ............. H04B 10/25
370/217
(Continued)

FOREIGN PATENT DOCUMENTS

JP 2003-163668 A 6/2003
JP 2004-007120 A 1/2004
(Continued)

OTHER PUBLICATIONS

Japan Patent Office, Notice of Reasons for Rejection for Japanese Patent Application No. 2010-259305 dated Feb. 4, 2014.
(Continued)

*Primary Examiner* — Neil R McLean
*Assistant Examiner* — Darryl V Dottin
(74) *Attorney, Agent, or Firm* — Merchant & Gould P.C.

(57) ABSTRACT

A communication system includes a printing device, a terminal device, and another device. The printing device includes a communication interface that enables communication through at least two modes; an operating portion that accepts a mode-switch instruction; a printing portion that prints an image based on print data, and a processor. In a direct communication mode, the printing device communicates directly with the terminal device. In an indirect communication mode, the printing device communicates indirectly with the other device. The processor switches the communication mode from the indirect communication mode to the direct communication mode when the operating portion accepts the mode-switch instruction, and switches the communication mode from the direct communication mode to the indirect communication mode when the processor determines that the printing device has finished receiving print data. Communication between the printing (Continued)

and terminal devices includes transmitting the print data from the terminal device to the printing device.

22 Claims, 8 Drawing Sheets

(52) U.S. Cl.
CPC ............ *G06F 3/1285* (2013.01); *G06F 3/122* (2013.01); *G06F 3/1226* (2013.01); *G06F 3/1284* (2013.01); *H04W 76/23* (2018.02); *H04W 84/18* (2013.01)

(58) Field of Classification Search
USPC ........................................................ 358/1.15
See application file for complete search history.

(56) References Cited

U.S. PATENT DOCUMENTS

| | | | |
|---|---|---|---|
| 7,057,753 | B1 | 6/2006 | Kajita et al. |
| 7,966,016 | B2 * | 6/2011 | Moritomo ............. H04L 63/123 |
| | | | 370/254 |
| 2003/0054818 | A1 * | 3/2003 | Bahl .................... H04W 88/06 |
| | | | 455/432.1 |
| 2003/0100335 | A1 | 5/2003 | Gassho et al. |
| 2003/0236064 | A1 * | 12/2003 | Shiohara et al. ................. 455/1 |
| 2005/0122929 | A1 | 6/2005 | Zuniga |
| 2005/0170774 | A1 | 8/2005 | Shiohara et al. |
| 2006/0017963 | A1 * | 1/2006 | Sakuda ............. H04N 1/00278 |
| | | | 358/1.15 |
| 2006/0116147 | A1 | 6/2006 | Hashizume |
| 2006/0200564 | A1 | 9/2006 | Watanabe et al. |
| 2006/0246941 | A1 * | 11/2006 | Watanabe ............. H04W 48/16 |
| | | | 455/552.1 |
| 2008/0024591 | A1 * | 1/2008 | Doi ....................... H04W 8/245 |
| | | | 348/14.01 |
| 2008/0225331 | A1 * | 9/2008 | Jung .................... G06F 3/1209 |
| | | | 358/1.15 |
| 2008/0261640 | A1 | 10/2008 | Yoshida |
| 2011/0032918 | A1 | 2/2011 | Sakai |
| 2012/0127523 | A1 * | 5/2012 | Terashita ............. G06F 3/1203 |
| | | | 358/1.15 |

FOREIGN PATENT DOCUMENTS

| | | |
|---|---|---|
| JP | 2004-328289 A | 11/2004 |
| JP | 2005-064552 A | 3/2005 |
| JP | 2005-198154 A | 7/2005 |
| JP | 2005-303565 A | 10/2005 |
| JP | 2005-303821 A | 10/2005 |
| JP | 2006-101293 A | 4/2006 |
| JP | 2007-323610 A | 12/2007 |
| JP | 2009-153184 A | 7/2009 |
| JP | 2009-267697 A | 11/2009 |
| JP | 2010-093430 A | 4/2010 |

OTHER PUBLICATIONS

Notice of Reasons for Rejection issued in related Japanese patent application 2010-259305, dated Aug. 25, 2015.
Office Action issued in related Japanese Patent Application No. 2010-259305 dated Aug. 19, 2014.

\* cited by examiner

PRINTING DEVICES AND TERMINAL DEVICES THAT SWITCH COMMUNICATION MODES

CROSS-REFERENCE TO RELATED APPLICATION

This application is a continuation application of U.S. patent application Ser. No. 13/299,049 filed Nov. 17, 2011, and further claims priority from Japanese Patent Application No. 2010-259305, filed on Nov. 19, 2010, both applications are incorporated herein by reference.

BACKGROUND OF THE INVENTION

1. Field of the Invention

The invention relates to communication between printing devices and terminal devices.

2. Description of Related Art

A known printing device communicates with a terminal device using various modes. In particular, a known printing device communicates wirelessly with a terminal device via an access point using an infrastructure mode. The infrastructure mode is one communication mode of a wireless LAN. The printing device communicates wirelessly with another terminal device by directly connecting thereto using an ad hoc mode. The ad hoc mode is another communication mode of the wireless LAN.

SUMMARY OF THE INVENTION

In the above-described printing device, for example, the terminal device may search periodically for a connection signal for the ad hoc mode, such that the terminal device may switch the communication mode to the ad hoc mode during communication in the infrastructure mode. Nevertheless, this process may increase a processing load in the terminal device and the printing device. Embodiments of the invention described herein may address the above-described problem by reducing the processing load in the terminal device and the printing device when the printer switches the communication mode.

A printing device disclosed herein may comprise a printing portion, a first processor, and a first memory. The printing portion may be configured to print images based on print data. The first memory may be configured to store computer-readable instructions therein. The computer-readable instructions may instruct the printing device to perform several functions. The computer-readable instructions may instruct the printing device to perform a function of communicating directly with a terminal device by bypassing an accessory device. The computer-readable instructions may instruct the printing device to perform a function of communicating indirectly with another device via an accessory device. The computer-readable instructions may instruct the printing device to perform a function of accepting a mode-switch instruction. The computer-readable instructions may instruct the printing device to perform a function of switching a communication mode between a direct communication mode and an indirect communication mode. In the direct communication mode, the printing device may communicate directly with the terminal device and the printing device may not communicate indirectly with the other device. In the indirect communication mode, the printing device may communicate indirectly with the other device and the printing device may not communicate directly with the terminal device. The computer-readable instructions may instruct the printing device to perform a function of receiving the mode-switch instruction while in the indirect communication mode and switching the communication mode to the direct communication mode to communicate directly with the terminal device. The computer-readable instructions may instruct the printing device to perform a function of receiving the print data from the terminal device while in the direct communication mode and switching the communication mode to the indirect communication mode thereafter.

A non-transitory, computer-readable storage medium disclosed herein may store a computer program executable by a processor of a printing device which may be configured to print an image based on print data. The program may instruct the processor to execute several functions. The non-transitory, computer-readable storage medium may comprise the program which instructs the processor to execute the function of communicating directly with a terminal device and bypassing an accessory device. The non-transitory, computer-readable storage medium may comprise the program which instructs the processor to execute the function of communicating indirectly with another device using the accessory device. The non-transitory, computer-readable storage medium may comprise the program which instructs the processor to execute the function of accepting a mode-switch instruction. The non-transitory, computer-readable storage medium may comprise the program which instructs the processor to execute the function of switching a communication mode between a direct communication mode and an indirect communication mode. In the direct communication mode, the printing device may communicate directly with the terminal device and the printing device may not communicate indirectly with the other device. In the indirect communication mode, the printing device may communicate indirectly with the other device and the printing device may not communicate directly with the terminal device. The non-transitory, computer-readable storage medium may comprise the program which instructs the processor to execute the function of receiving the mode-switch instruction while in the indirect communication mode and switching the communication mode to the direct communication mode to communicate directly with the terminal device. The non-transitory, computer-readable storage medium may comprise the program which instructs the processor to execute the function of receiving the print data from the terminal device while in the direct communication mode and switching the communication mode to the indirect communication mode thereafter.

A printing device disclosed herein may comprise a communication interface, an operating portion, and a processor. The communication interface may be configured to enable communication through at least two communication modes. The operating portion may be configured to accept a mode-switch instruction. The printing portion may be configured to print an image based on print data. Communication between the printing device and a terminal device may comprise transmitting print data from the terminal device to the printing device. A first communication mode of the at least two communication modes may be a direct communication mode in which the printing device may be configured to communicate directly with the terminal device only. A second communication mode of the at least two communication modes may be an indirect communication mode in which the printing device may be configured to communicate indirectly with another device through an accessory device only. The processor may be configured to switch the communication mode of the printing device from the indirect communication mode to the direct communication mode when the printing device is in the indirect communication mode and the operating portion accepts the mode-switch instruction. The processor may be configured to switch the communication mode of the printing device from the direct communication mode to the indirect communication mode when the printing device is in the direct communication mode and the processor determines that the printing device has finished receiving the print data.

A communication system disclosed herein may comprise a printing device, a terminal device, and another device. The printing device may comprise a printing device communication interface, an operating portion, a printing portion, and a first processor. The printing device communication interface may be configured to enable communication through at least two communication modes. The operating portion may be configured to accept a mode-switch instruction. The printing portion may be configured to print an image based on print data. A first communication mode of the at least two communication modes may be a direct communication mode in which the printing device is configured to communicate directly with the terminal device only. A second communication mode of the at least two communication modes may be an indirect communication mode in which the printing device is configured to communicate indirectly with the other device through an accessory device only. The first processor may be configured to switch the communication mode of the printing device from the indirect communication mode to the direct communication mode when the printing device is in the indirect communication mode and the operating portion accepts the mode-switch instruction. The first processor may be configured to switch the communication mode of the printing device from the direct communication mode to the indirect communication mode when the printing device is in the direct communication mode and the first processor determines that the printing device has finished receiving print data. The terminal device may comprise a second processor and a terminal device memory. Communication between the printing device and the terminal device may comprise transmitting the print data from the terminal device to the printing device.

The invention may be realized in various configurations including a printing device, a terminal device, a system comprising the printing device and the terminal device, a communication method, a computer program for controlling such devices or systems or for controlling the communication method, and a computer-readable storage device storing the computer program.

According to the invention, after a printing device switches the communication mode from the indirect communication mode to the direct communication mode in accordance with the user's mode-switch instruction and after the printing device receives the print data from a terminal device by the direct communication, the printing device may switch the communication mode back to the indirect communication mode. Because the printing device adopts the structure and configuration for switching the communication mode between the indirect communication mode and the direct communication mode, this process may reduce a processing load in the terminal device and the printing device as compared with a structure in which one of the printing device and the terminal device searches for a connection signal for direct communication during the indirect communication to switch the communication mode between the indirect communication mode and the direct communication mode.

Other objects, features, and advantages will be apparent to persons of ordinary skill in the art from the following detailed description of the invention and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

DETAILED DESCRIPTION OF EMBODIMENTS OF THE INVENTION

Figure 1:
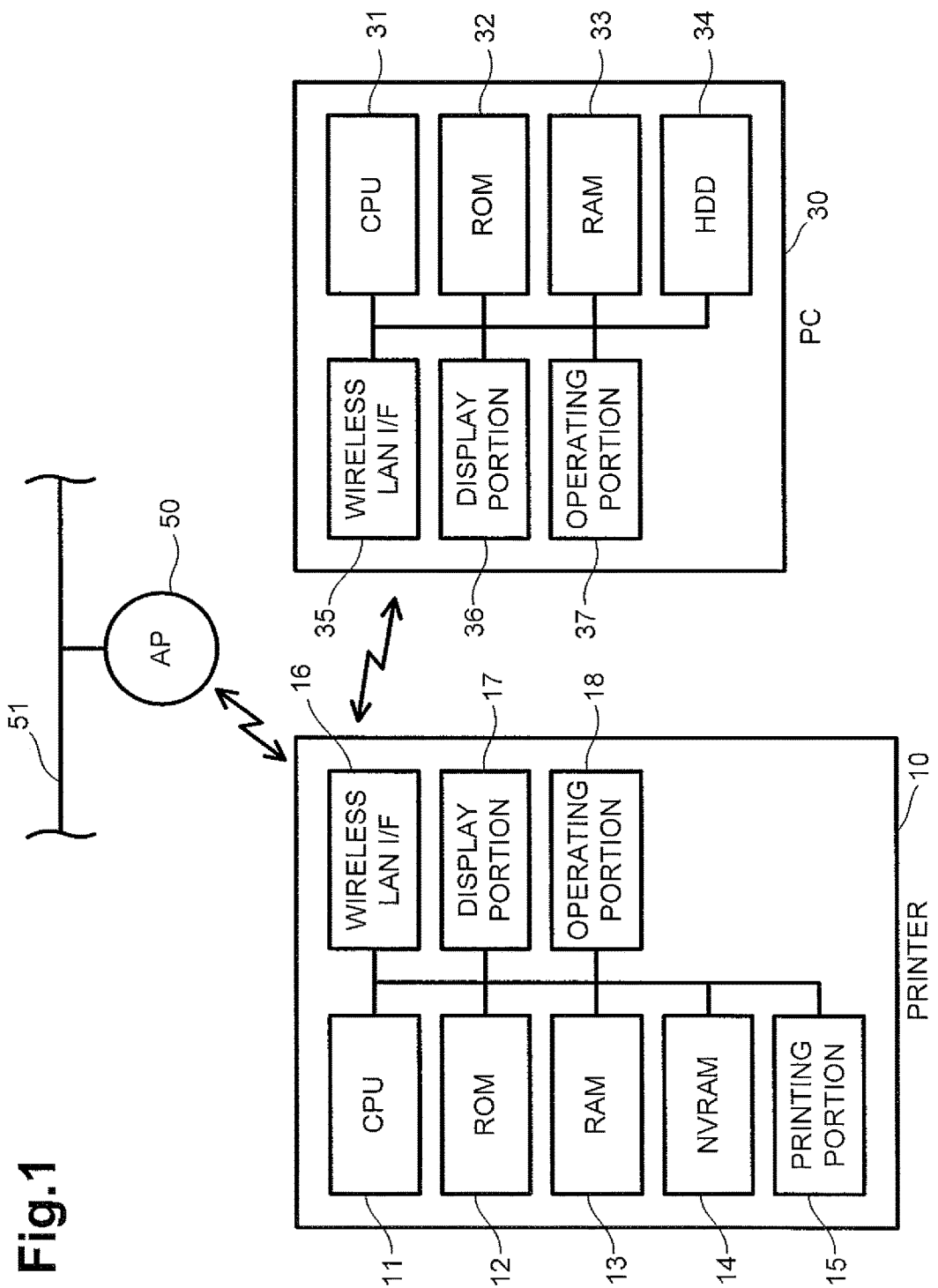
FIG. 1 is a block diagram depicting a configuration of a system in an embodiment according to one or more aspects of the invention.

Embodiments now are described in detail with reference to the accompanying drawings, like reference numerals being used for like corresponding parts in the various drawings.

An embodiment of the invention now is described with reference to FIGS. 1 to 5.

A configuration of a system according to the embodiment now is described with reference to FIG. 1. As depicted in FIG. 1, a printing device, e.g., a printer 10, may be configured to communicate wirelessly with an access point ("AP") 50 connected by a network line 51, e.g., a local area network ("LAN"). In the embodiment, a terminal device, e.g., a personal computer ("PC") 30, may be configured to bypass access point 50, and may establish, directly and temporarily, a connection with printer 10 to transmit print data from PC 30 to printer 10 for performing printing on printer 10.

Printer 10 may comprise a central processing unit ("CPU") 11, a read-only memory ("ROM") 12, a random-access memory ("RAM") 13, a nonvolatile random-access memory ("NVRAM") 14, a printing portion 15, a wireless LAN interface ("I/F") 16, a display portion 17, and an operating portion 18.

ROM 12 and NVRAM 14 may be configured to store programs for implementing operations of printer 10, e.g., a printer-side, mode-switch printing process (described later). Each of a first direct communication executing portion, an indirect communication executing portion, a switching portion, a transmission executing portion, a first accepting portion, and a receiving portion, e.g., portions of CPU 11, may be configured to control respective components of printer 10 in accordance with the programs read from ROM 12 and NVRAM 14. CPU 11 may control printing portion 15 to print an image onto a sheet based on print data received from other devices via wireless LAN interface 16.

A first wireless interface, e.g., wireless LAN interface 16, may be configured to operate in one of an indirect communication mode, e.g., an infrastructure mode, and a direct communication mode, e.g., an ad hoc mode. In the infrastructure mode, wireless LAN interface 16 may communicate indirectly with a device or another device via access point 50. In the ad hoc mode, wireless LAN interface 16 may bypass access point 50 and may communicate directly with the device.

NVRAM 14 may be configured to store, for example, one or more of a service set identifier ("SSID") for identifying a network, an authentication method, an encryption key, an Internet Protocol ("IP") address for identifying printer 10, a subnet mask, and a Media Access Control ("MAC") address of wireless LAN interface 16 as one or more identifiers to be used when wireless LAN interface 16 communicates in the infrastructure mode.

NVRAM 14 may be configured to store, for example, one or more of an SSID for identifying a network, an authentication method, an encryption key, an IP address for identifying printer 10, a subnet mask, and a MAC address of wireless LAN interface 16 as one or more identifiers to be used when wireless LAN interface 16 communicates in the ad hoc mode during a mode-switch printing process. The one or more identifiers to be used in the mode-switch printing process may be, for example, one or more values pre-stored in NVRAM 14 by the manufacturer during manufacture of printer 10, one or more values defined in a program for the printer-side, mode-switch printing process, one or more values specified by a user, or a combination of such values.

CPU 11 may be configured to switch an operating mode of wireless LAN interface 16. The ad hoc mode may not be available when wireless LAN interface 16 operates in the infrastructure mode. The infrastructure mode may not be available when wireless LAN interface 16 operates in the ad hoc mode.

Display portion 17 may comprise a display and a lamp and may be configured to display various setting screens and operating statuses of printer 10. Operating portion 18 may comprise a plurality of input devices, e.g., buttons or keys, and a user may input various instructions through operating portion 18.

PC 30 may be, for example, a portable computer, and may comprise a central processing unit ("CPU") 31, a read-only memory ("ROM") 32, a random-access memory ("RAM") 33, a hard disk drive ("HDD") 34, a wireless LAN interface ("I/F") 35, a display portion 36, and an operating portion 37.

ROM 32 may be configured to store programs, e.g., a basic input output system ("BIOS"). HDD 34 may be configured to store operating systems ("OSes"), printer drivers, and programs for performing a PC-side, mode-switch printing process (described below). A second direct communication executing portion, a selecting portion, and a third accepting portion, e.g., CPU 31, may be configured to control each portion of PC 30 in accordance with the programs read from ROM 32 or from HDD 34.

A second wireless interface, e.g., wireless LAN interface 35, may be configured to operate in one of an indirect communication mode, e.g., an infrastructure mode, and a direct communication mode, e.g., an ad hoc mode. In the infrastructure mode, wireless LAN interface 35 may communicate indirectly with a device via access point 50. In the ad hoc mode, wireless LAN interface 35 may bypass access point 50 and may communicate directly with the device.

HDD 34 may be configured to store one or more of an SSID, an authentication method, an encryption key, an IP address for PC 30, a subnet mask, and a MAC address of wireless LAN interface 35 as one or more identifiers to be used when wireless LAN interface 35 communicates in the ad hoc mode during the mode-switch printing process.

The one or more identifiers for mode-switch printing stored in HDD 34 may be, for example, one or more values defined in a program for the PC-side, mode-switch printing process, one or more values specified by a user, or a combination of such values. While in the ad hoc mode, PC 30 may connect with printer 10 for communication when the SSID, the authentication method, and the encryption key of the one or more identifiers stored in HDD 34 of PC 30 match the one or more identifiers stored in NVRAM 14 of printer 10.

While in the infrastructure mode, PC 30, as depicted in FIG. 1, may not communicate with access point 50 and may not participate in the network in which printer 10 participates. Alternatively or additionally, PC 30 may be configured to participate in another network (not depicted) or the network in which printer 10 participates. When PC 30 is so configured, HDD 34 may store one or more of an SSID, an authentication method, an encryption key, an IP address of PC 30, a subnet mask, and a MAC address of wireless LAN interface 35, as one or more identifiers to be used when wireless LAN interface 35 communicates in the infrastructure mode.

CPU 31 may be configured to switch an operating mode of wireless LAN interface 35. The ad hoc mode may not be available when wireless LAN interface 35 operates in the infrastructure mode. The infrastructure mode may not be available when wireless LAN interface 35 operates in the ad hoc mode.

The display portion 36 may comprise a display, and CPU 31 may control display portion 36 to display various images. Operating portion 37 may comprise a keyboard and a pointing device which a user may use to input various instructions into CPU 31.

The mode-switch printing process now is described. During the mode-switch printing process, printer 10 may print based on print data transmitted from CPU 31 of PC 30 after switching a setting of printer 10 from a first setting to a second setting. In the first setting, printer 10 may communicate with access point 50 in the infrastructure mode. In the second setting, printer 10 may communicate with PC 30 in the ad hoc mode. The mode-switch printing process may comprise the printer-side, mode-switch printing process to be executed in printer 10 and the PC-side, mode-switch printing process to be executed in PC 30.

The printer-side, mode-switch printing process now is described with reference to FIG. 2.

Figure 2:
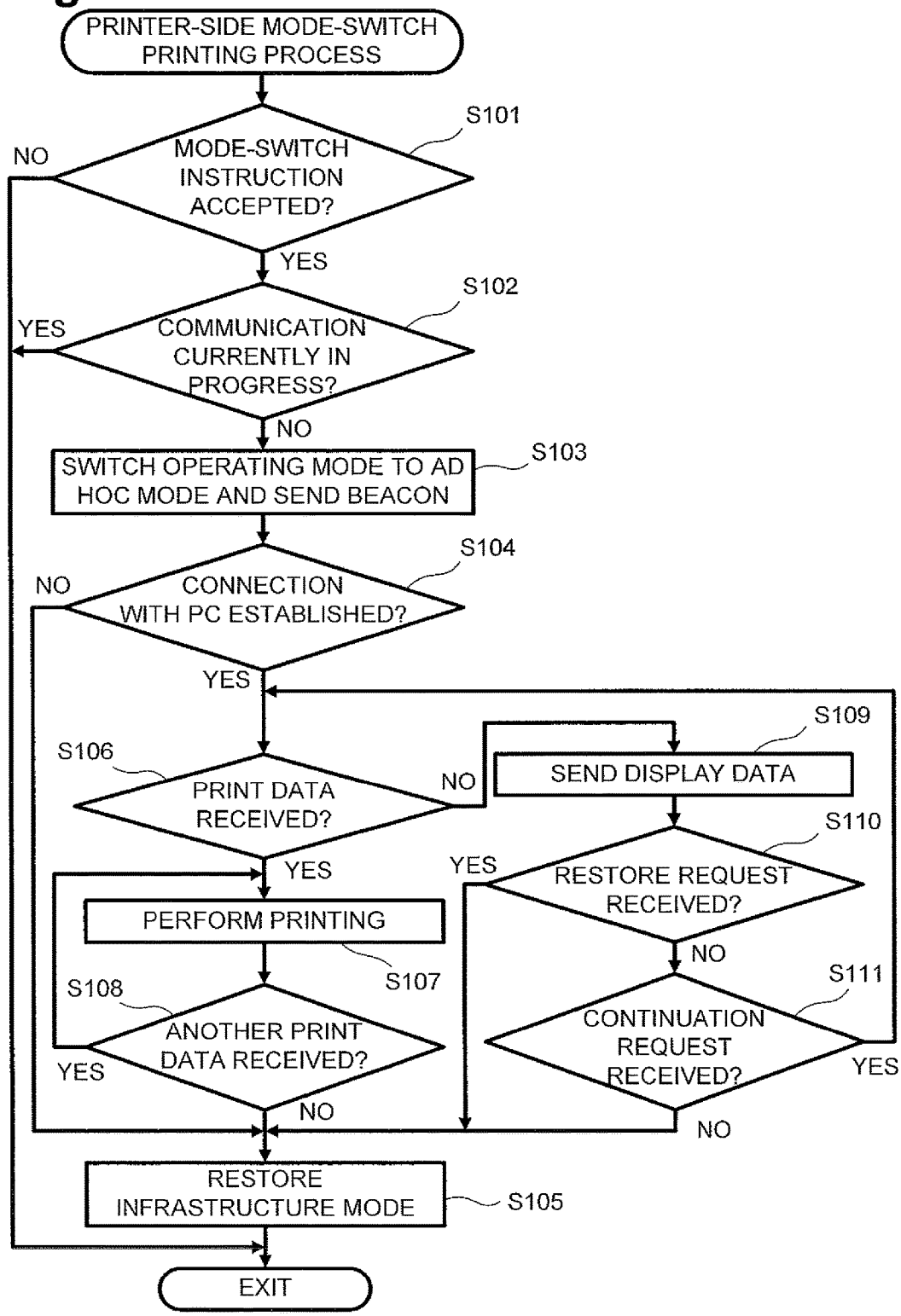
FIG. 2 is a flowchart of a printer-side, mode-switch printing process in the embodiment according to one or more aspects of the invention.

While wireless LAN interface 16 of printer 10 is in infrastructure mode, CPU 11 of printer 10 may perform repeatedly the printer-side, mode-switch printing process, as depicted in FIG. 2. When the printer-side, mode-switch printing process begins, CPU 11 may determine whether printer 10 has accepted a mode-switch instruction input through operating portion 18 (step S101). When CPU 11 determines that printer 10 has not accepted the mode-switch instruction (step S101: NO), CPU 11 may exit the printer-side, mode-switch printing process.

When CPU 11 determines that printer 10 has accepted the mode-switch instruction (step S101: YES), CPU 11 may determine whether wireless LAN interface 16 currently is communicating in the infrastructure mode (step S102). For example, when printer 10 is receiving print data from another PC (not depicted) connected with network line 51, CPU 11 may determine that wireless LAN interface 16 currently is communicating in the infrastructure mode (step S102: YES), and CPU 11 may exit the printer-side, mode-switch printing process. In this state, CPU 11 may not switch the operating mode of wireless LAN interface 16 to the ad hoc mode. When wireless LAN interface 16 currently is communicating in the infrastructure mode, display portion 17 may display a message indicating that the mode-switch printing process may not be performed because communication currently is in progress.

When wireless LAN interface 16 currently is not communicating in the infrastructure mode (step S102: NO), CPU 11 may switch the operating mode of wireless LAN interface 16 from the infrastructure mode to the ad hoc mode and may send periodically a beacon for establishing a connection with PC 30 (step S103). The beacon may comprise the SSID and the MAC address for mode-switch printing read from NVRAM 14 by CPU 11.

Upon receipt of the beacon, PC 30 may attempt to connect with printer 10 by sending a connection request to printer 10. The connection request sent from PC 30 may comprise, for example, the authentication method and the encryption key. CPU 11 of printer 10 may determine whether printer 10 and PC 30 have established a connection therebetween in the ad hoc mode by determining whether the received authentication method and encryption key match the authentication method and encryption key for the mode-switch printing process stored in NVRAM 14 (step S104).

When printer 10 and PC 30 have not established a connection therebetween because, for example, the authentication method or the encryption key is mismatched, the signal strength is weak, or printer 10 has not received a signal during a predetermined period of time (step S104: NO), CPU 11 may switch the operating mode of wireless LAN interface 16 back to the infrastructure mode and may restore the previous settings specified before the printer-side, mode-switch printing process began (step S105). Subsequently, CPU 11 may exit the printer-side, mode-switch printing process. When CPU 11 switches the operating mode of wireless LAN interface 16 back to the infrastructure mode and restores the previous settings, the printer 10 may communicate with access point 50 via wireless LAN interface 16.

When printer 10 and PC 30 have established a connection therebetween because the authentication method and the encryption key sent from PC 30 match the authentication method and the encryption key stored in NVRAM 14 (step S104: YES), CPU 11 may determine whether printer 10 has received print data from PC 30 via wireless LAN interface 16 within a predetermined time period (step S106). When printer 10 has received the print data within the predetermined time period (step S106: YES), printing portion 15 may print an image based on the received print data (step S107). Specifically, after printer 10 and PC 30 have established a connection therebetween, CPU 11 may wait for receipt of print data or the end of the predetermined time period. When the print data has been received within the predetermined time period, CPU 11 may print without waiting for the end of the predetermined time period.

CPU 11 then may determine whether printer 10 has received another print data within the predetermined time period (step S108). When printer 10 has received the other print data within the predetermined time period (step S108: YES), printer 10 may print based on the received print data (step S107). When printer 10 has not received other print data within the predetermined time period (step S108: NO), CPU 11 may switch the operating mode back to the infrastructure mode and may restore the previous settings (step S105). CPU 11 then may exit the printer-side, mode-switch printing process.

When printer 10 has not received the print data from PC 30 within the predetermined time period (step S106: NO), CPU 11 may send display data for displaying a message on display portion 36 of PC 30 to PC 30 (step S109). Based on information input in response to the display data, PC 30 may select and send one of a restore instruction and a continuation instruction. The restore instruction may be an instruction for restoring the infrastructure mode. The continuation instruction may be an instruction for continuing a printing operation, such as an instruction to keep the current connection.

CPU 11 then may determine whether printer 10 has received the restore request in response to the display data within a predetermined time period (step S110). When printer 10 has received the restore request within the predetermined time period (step S110: YES), CPU 11 may switch the operating mode back to the infrastructure mode and may restore the previous settings (step S105). When printer 10 has received the continuation request within the predetermined time period (step S110: NO and S111: YES), printer 10 may wait for receipt of print data (step S106). When printer 10 has not received the restore request and the continuation request within the predetermined time period (step S110: NO and S111: NO), CPU 11 may switch the operating mode to the infrastructure mode and may restore the previous settings (step S105).

Figure 3:
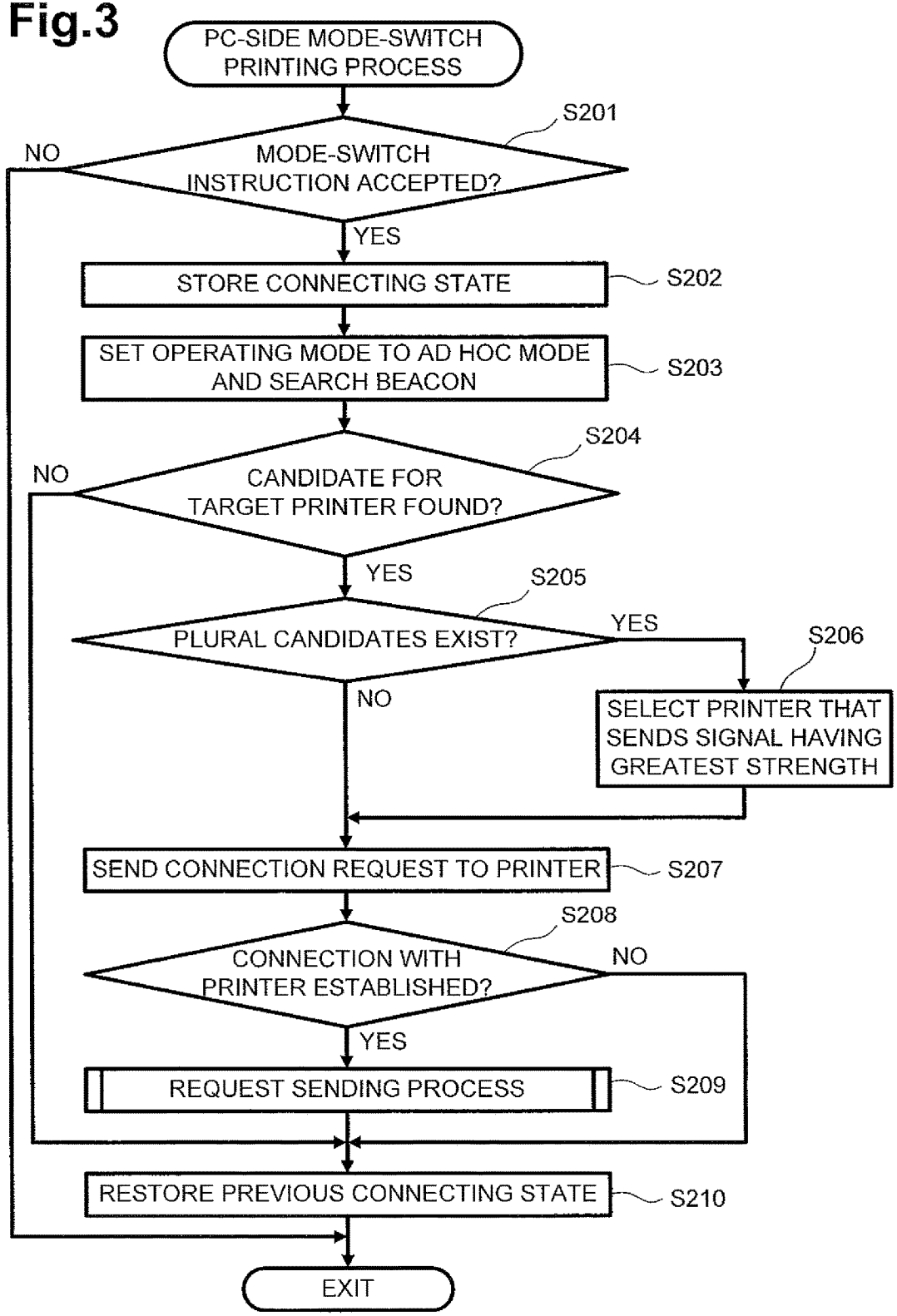
FIG. 3 is a flowchart of a PC-side, mode-switch printing process in the embodiment according to one or more aspects of the invention.

The PC-side, mode-switch printing process now is described with reference to FIG. 3.

CPU 31 of PC 30 may perform repeatedly the PC-side, mode-switch printing process. When the PC-side, mode-switch printing process begins, CPU 31 may determine whether PC 30 has accepted a mode-switch instruction, which may be input through operating portion 37 (step S201). When PC 30 has not accepted the mode-switch instruction (step S201: NO), CPU 31 may exit the PC-side, mode-switch printing process.

When PC 30 has accepted the mode-switch instruction (step S201: YES), CPU 31 may store the current connecting state of wireless LAN interface 35 into RAM 33 (step S202). The connecting state may refer to the operating mode of wireless LAN interface 35 before CPU 31 switches the operating mode of wireless LAN interface 35. When wireless LAN interface 35 currently is not used in either operating mode, CPU 31 may store the current state of wireless LAN interface 35 in RAM 33.

CPU 31 may set the operating mode of wireless LAN interface 35 to the ad hoc mode and may search a beacon for establishing a connection with PC 30 from printer 10 (with respect to FIGS. 3-5, printer 10 is referred to as a target printer 10) (step S203). CPU 31 may search through beacons received by wireless LAN interface 35 for a beacon comprising, for example, the SSID and MAC address that match setting values for the mode-switch printing process stored in HDD 34.

When few printers are available for a mode-switch instruction, CPU 31 may determine whether a printer that transmits a beacon is target printer 10 based on manufacturer information from the MAC address comprised in the beacon which may indicate whether the printer is available for the mode-switch instruction.

As a result of searching the beacon, CPU 31 then may find a candidate for target printer 10 (step S204). When CPU 31 does not find the candidate for target printer 10 (step S204: NO), CPU 31 may restore the previous connecting state based on the data stored into RAM 33 during step S202 (step S210) and may exit the PC-side, mode-switch printing process.

When CPU 31 finds the candidate for target printer 10 (step S204: YES), CPU 31 may determine whether a plurality of candidates for target printer 10 exist (step S205). When the plurality of candidates for target printer 10 exist (step S205: YES), CPU 31 may select one candidate from the plurality of candidates, whose signal may be received by wireless LAN interface 35 with the greatest strength, as target printer 10 (step S206).

When the user attempts to connect PC 30 to a printer, the printer and the PC 30 may be located close to each other. A printer from among the plurality of candidates for target printer 10 which sends a signal having the greatest strength may have a greater chance of becoming target printer 10. When the plurality of candidates for target printer 10 exist, the plurality of candidates may be displayed on display portion 36, and a user may select a target printer 10 from the plurality of candidates through operating portion 37.

When CPU 31 finds only one candidate for target printer 10 (step S205: NO), CPU 31 may determine that the only one candidate is target printer 10.

CPU 31 may send a connection request to target printer 10 through wireless LAN interface 35 (step S207). The connection request may comprise, for example, the authentication method and encryption key for mode-switch printing process which CPU 31 reads from HDD 34.

When PC 30 has received a response from target printer 10 and when PC 30 and target printer 10 have established a connection therebetween (step S208), CPU 31 may perform a request sending process (described below) to send a request to target printer 10 (step S209). After CPU 31 performs the request sending process or when target printer 10 and PC 30 and target printer 10 may not establish a connection therebetween (step S208: NO), CPU 31 may restore the previous connecting state based on the data stored into RAM 33 (step 210). CPU 31 then may exit the PC-side, mode-switch printing process.

Figure 4:
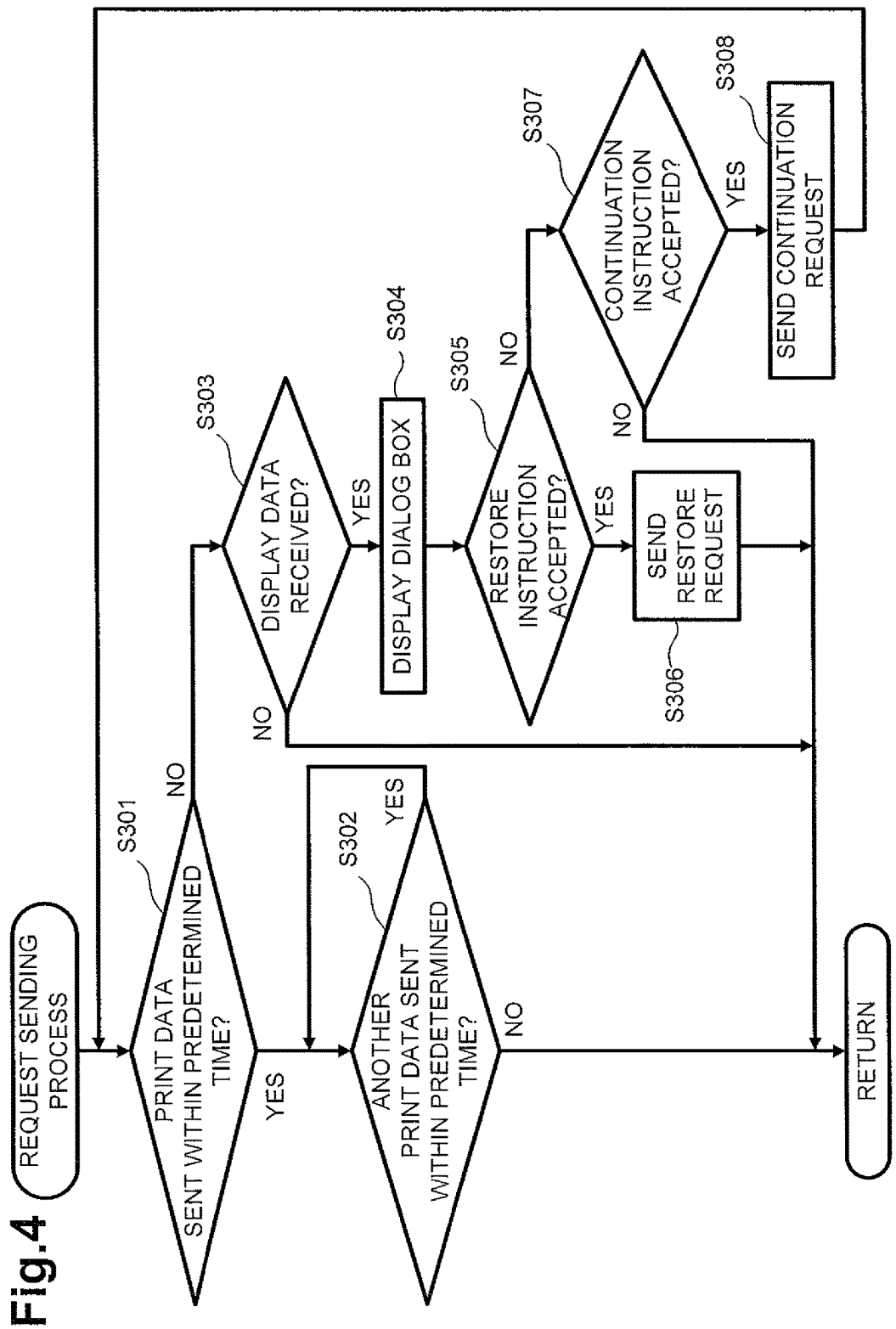
FIG. 4 is a flowchart of a request sending process in the embodiment according to one or more aspects of the invention.

The request sending process now is described with reference to FIG. 4.

When the request sending process begins, CPU 31 of PC 30 may determine whether PC 30 sent (first) print data within a predetermined time period (step S301). CPU 31 may wait until CPU 31 determines that PC 30 sent (first) print data within the predetermined time period or until the end of the predetermined time period.

In parallel with the request sending process, the user may specify image data to be printed and may input through operating portion 37 a print instruction to perform printing of the image data. Upon receipt of the print instruction, CPU 31 may request a printer driver to generate print data based on the specified image data and may send the print data to target printer 10 via wireless LAN interface 35.

When PC 30 sends the print data before the end of the predetermined time period (step S301: YES), CPU 31 may determine whether PC 30 sent another (second) print data during a period between the time when PC 30 sent the previous (first) print data and the end of the predetermined time period (step S302). When PC 30 has sent the other (second) print data during this period (step S302: YES), CPU 31 may repeat step S302 to determine whether PC 30 sent one or more of still another (third, fourth, or more) print data during another period between the time when PC 30 sent the other (second) print data the end of the predetermined time period. CPU 31 may exit the request sending process at the end of the predetermined time period when PC 30 does not send the other (second) print data and the one or more of still another (third, fourth, or more) print data (step S302: NO).

When CPU 31 determines that PC 30 did not send the (first) print data before the end of the predetermined time period (step S301: NO), CPU 31 may determine whether PC 30 has received the display data from target printer 10 (step S303). When PC 30 has not received the display data (step S303: NO), CPU 31 may exit the request sending process. When PC 30 has received the display data (step S303: YES), CPU 31 may display a dialog box 40 on display portion 36 based on the display data (step S304).

Figure 5:
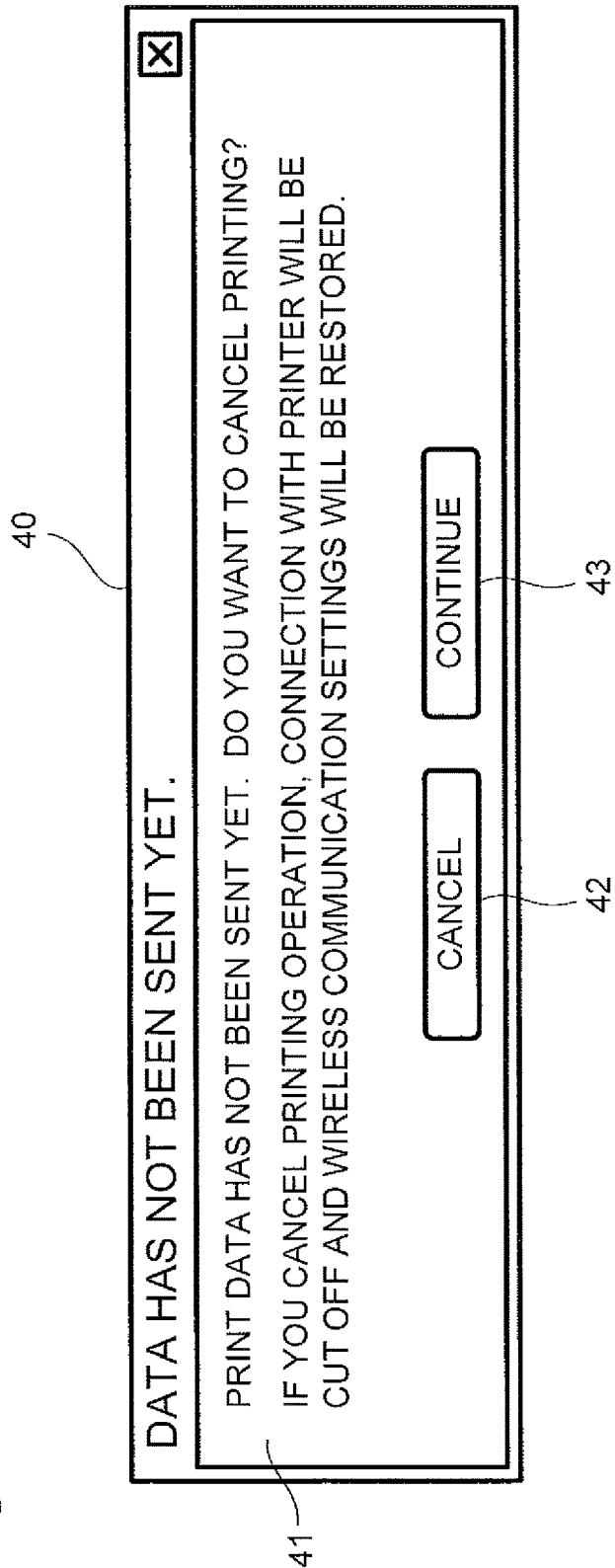
FIG. 5 illustrates an example of a dialog box in the embodiment according to one or more aspects of the invention.

Dialogue box 40 now is described with reference to FIG. 5.

Dialog box 40 may display a message 41 indicating that the print data has not been sent and that the connection with target printer 10 will be cut off and that the previous connection settings will be restored if the printing operation is cancelled. Dialog box 40 may comprise a print cancel button 42 and a print continue button 43. The user may select one of buttons 42 and 43 through operating portion 37. Selecting print cancel button 42 may generate a restore instruction which instructs CPU 31 to cancel the sending of print data and to restore the previous connecting state. Selecting print continue button 43 may generate a continuation instruction which instructs CPU 31 to maintain the current connecting state.

After displaying dialog box 40 and when PC 30 has accepted the restore instruction before the end of a predetermined time period (step S305: YES), CPU 31 may send a restore request to target printer 10 (step S306). CPU 31 may exit the request sending process and may restore the previous connecting state (step S210 of FIG. 3). When target printer 10 has received the restore instruction (step S110: YES), target printer 10 may switch the operating mode of wireless LAN interface 16 to the infrastructure mode and may restore the previous settings.

After displaying dialog box 40 and when PC 30 has accepted the continuation instruction before the end of the predetermined time period (step S305: NO and S307: YES), CPU 31 may send a continuation request to target printer 10 (step S308). Then, CPU 31 may wait for sending print data (S301). When printer 10 has received the continuation request (step S111: YES), target printer 10 may wait further to receive print data.

After displaying dialog box 40 and when PC 30 has accepted an instruction before the end of the predetermined time period (step S305: NO and S307: NO), CPU 31 may exit the request sending process and may restore the previous connecting state at step S210 of FIG. 3.

According to this embodiment, target printer 10 may be configured to receive print data through the direct communication with PC 30 after CPU 11 switches the operating mode from the infrastructure mode to the ad hoc mode in accordance with the mode-switch instruction. After target printer 10 has received the print data, CPU 11 may switch the operating mode back to the infrastructure mode. With this configuration, the mode-switch printing process, in which target printer 10 and PC 30 have established a connection therebetween by switching the connecting mode of target printer 10 while the connection therebetween is not established, may be implemented readily. Accordingly, this system may have an increased convenience compared to other systems that may not perform a mode-switch printing process.

Because target printer 10 may switch the operating mode between the infrastructure mode and the ad hoc mode, target printer 10 may reduce a processing load in PC 30 and target printer 10, as compared with a structure in which one of target printer 10 and PC 30 searches for a connection signal for direct communication during the indirect communication. This embodiment may have a less-complicated configuration than, for example, a system having two distinct wireless LAN interfaces.

In target printer 10, CPU 11 may switch the operating mode back to the infrastructure mode when target printer 10 has received a restore request after CPU 11 switches the operating mode to the ad hoc mode. Therefore, CPU 11 may switch the operating mode back to the infrastructure mode at predetermined timing.

Further, when target printer 10 has not received print data from PC 30 before the end of the predetermined time period after the operating mode was switched to the ad hoc mode, target printer 10 may send the display data for displaying a message on display portion 36 to PC 30. By doing so, target printer 10 may provide appropriate information to the user of PC 30.

When target printer 10 currently is communicating in the infrastructure mode, CPU 11 may not switch the operating mode to the ad hoc mode (e.g., switching modes is prohibited) even when the mode-switch instruction is inputted. Accordingly, this may prevent a communication error from occurring due to switching modes during communication.

Target printer 10 may communicate wirelessly and directly with PC 30 via the wireless LAN interface 16 by bypassing the access point 50. Accordingly, target printer 10 and PC 30 may more readily communicate with each other.

PC 30 may communicate with target printer 10 using the pre-stored identifiers which are stored before starting the mode-switch printing process. Accordingly, the user does not need to input the identifiers through operating portion 37 during the mode-switch printing process.

PC 30 may be near one or more printers. When a plurality of candidates for target printer 10 which may connect to PC 30 exist and when PC 30 attempts to connect to a printer from among the plurality of candidates for target printer 10, PC 30 may select a printer whose signal may have the greatest strength, among signals corresponding to each candidate of the plurality of candidates, as target printer 10. In this manner, PC 30 may communicate with target printer 10. Consequently, the user may not have to select target printer 10 from the plurality of candidates.

Target printer 10 may switch from the ad hoc mode to the infrastructure mode after target printer 10 has received the restore instruction from PC 30. The user may input the restore instruction into PC 30, for example.

Figure 7:
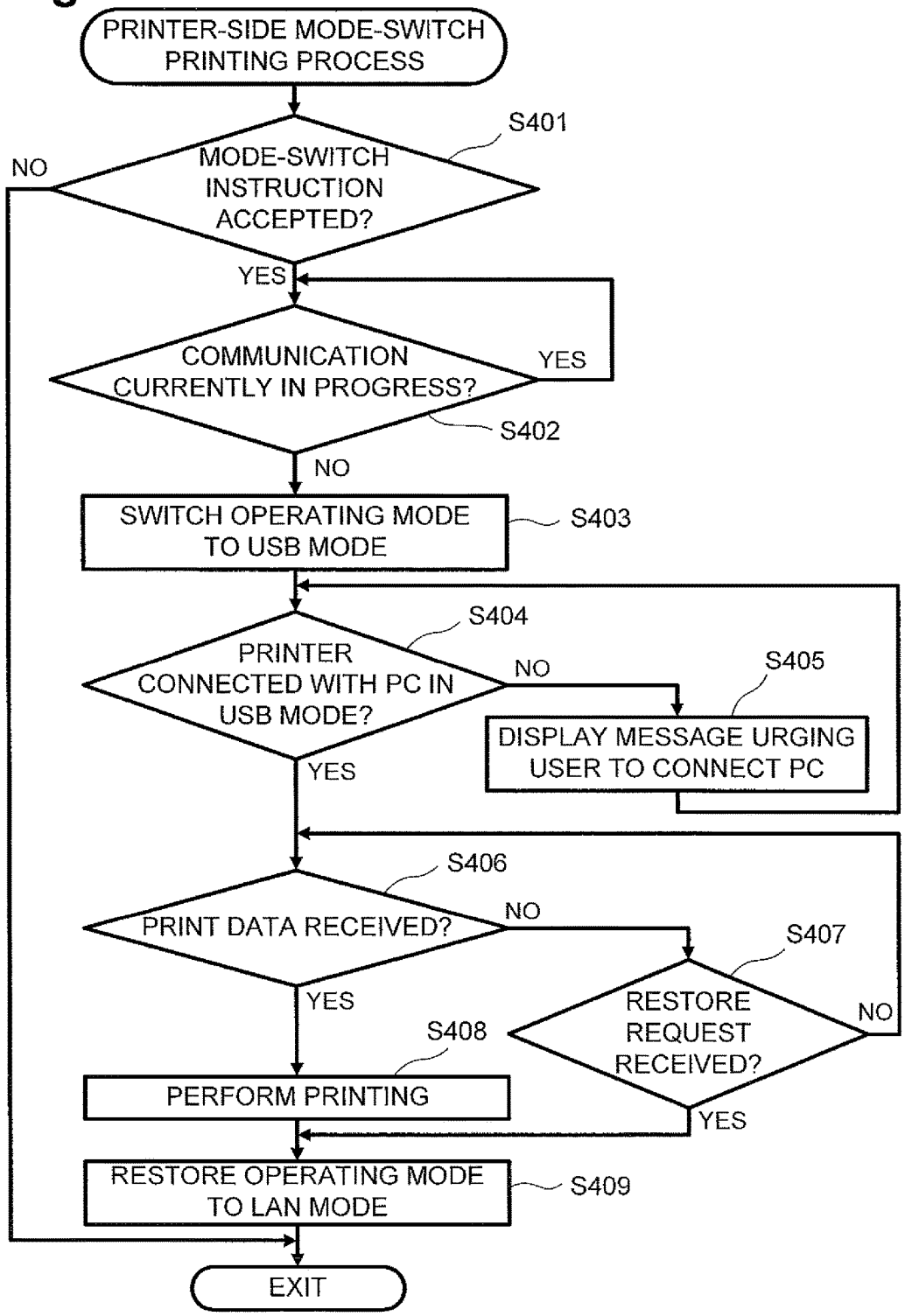
FIG. 7 is a flowchart of a printer-side, mode-switch printing process in the other embodiment according to one or more aspects of the invention.
Figure 8:
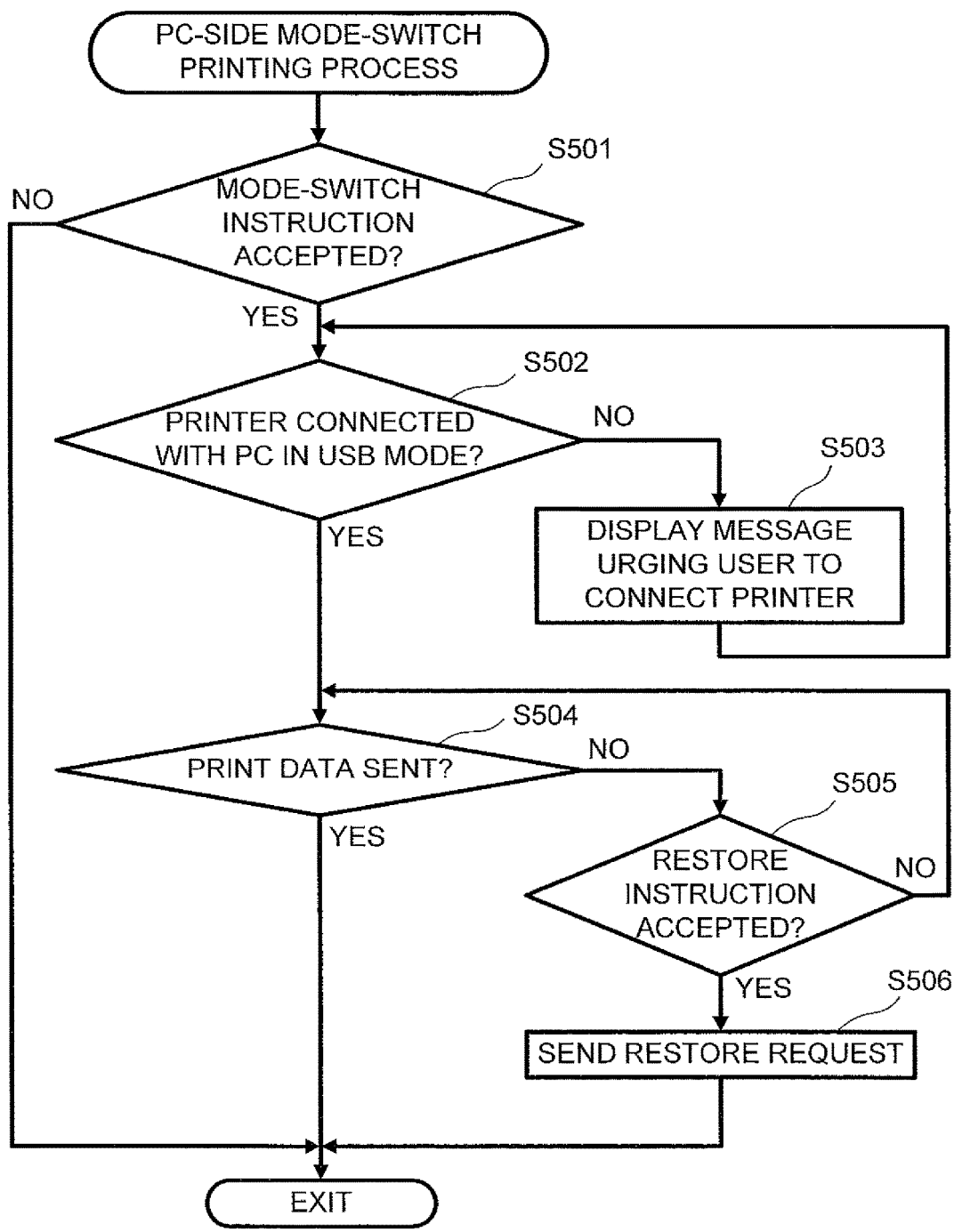
FIG. 8 is a flowchart of a PC-side, mode-switch printing process in the other embodiment according to one or more aspects of the invention.

Another embodiment now is described with reference to FIGS. 6 to 8.

Figure 6:
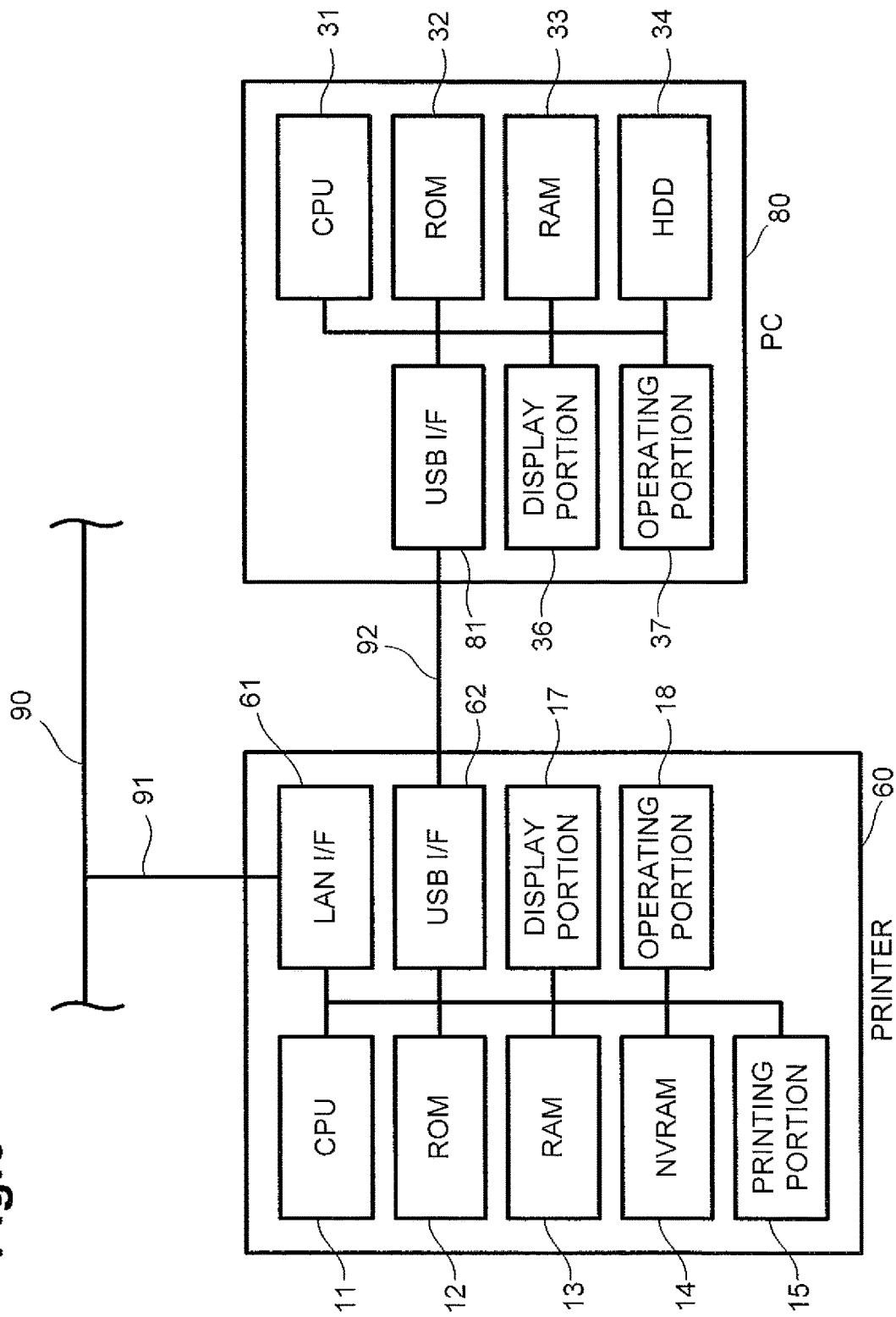
FIG. 6 is a block diagram depicting a configuration of a system in another embodiment according to one or more aspects of the invention.

As depicted in FIG. 6, the printing device, e.g., a printer 60, may connect with a network line 90 in a wired LAN network environment. In this system, the terminal device, e.g., a personal computer ("PC") 80, may bypass network line 90 to connect with printer 60 for printing.

Printer 60 and PC 80 may have interfaces which may be different from the interfaces of printer 10 and PC 30 described above. Printer 60 and PC 80 may have structures which are the same as the structures of printer 10 and PC 30, except for the irrespective interfaces. As noted above, like reference numerals used in both FIG. 1 and FIG. 6 designate similar components, and a detailed explanation of such components with respect to FIG. 6 is omitted.

Printer 60 may comprise a LAN interface ("I/F") 61 and a Universal Serial Bus ("USB") interface 62. LAN interface 61 may connect with network line 90 via a LAN cable 91, and may communicate indirectly with another device (e.g., another terminal device) (not depicted) connected with network line 90, via a hub (not depicted) connected with network line 90. USB interface 62 may communicate with PC 80 by directly connecting with PC 80 via a USB cable 92.

A CPU 11 of printer 60 may be configured to selectively switch a connecting mode between a LAN mode and a USB mode. In LAN mode, LAN interface 61 may be available, and USB interface 62 may be unavailable. In the USB mode, LAN interface 61 may be unavailable, and USB interface 62 may be available. When one of LAN interface 61 and USB interface 62 is unavailable, printer 60 may not supply power to the one of interface 61 or 62, respectively, that is unavailable.

PC 80 may comprise a USB interface 81. USB interface 81 may communicate with printer 60 by connecting directly with printer 60 via USB cable 92.

A printer-side, mode-switch printing process according to the other embodiment now is described with reference to FIG. 7.

CPU 11 may perform repeatedly the printer-side, mode-switch printing process while printer 60 is set to the LAN mode.

When the printer-side, mode-switch printing process begins, CPU 11 of printer 60 may determine whether printer 60 has accepted a mode-switch instruction input through operation portion 18 (step S401). When CPU 11 determines that printer 60 has not accepted the mode-switch instruction (step S401: NO), CPU 11 may exit the printer-side, mode-switch printing process. When CPU 11 determines that printer 60 has accepted the mode-switch instruction (step S401: YES), CPU 11 may determine whether printer 60 currently is communicating using LAN interface 61 (step S402). When CPU 11 determines that printer 60 currently is communicating using LAN interface 61 (step S402: YES), CPU 11 repeatedly determines at predetermined intervals whether printer 60 still is communicating using LAN interface 61 (step S402) until CPU 11 determines that printer 60 no longer is communicating using LAN interface 61. Until CPU 11 determines that printer 60 no longer is communicating using LAN interface 61, CPU 11 may not switch the operating mode of printer 60 to the USB mode.

When printer 60 currently is not communicating using LAN interface 61 (step S402: NO), CPU 11 may switch the operating mode from the LAN mode to the USB mode (step S403). At this time, CPU 11 may set USB interface 62 to be available and LAN interface 61 to be unavailable.

CPU 11 then may determine whether PC 80 is connected with USB interface 62 of printer 60 (step S404). When PC 80 is not connected with USB interface 62 (step S404: NO), CPU 11 may display a message on display portion 17 urging the user to connect PC 80 to USB interface 62 (step S405). CPU 11 may determine repeatedly whether PC 80 is connected with USB interface 62 of printer 60 until CPU 11 determines that PC 80 is connected with USB interface 62 of printer 60 (step S404: YES).

When CPU 11 determines that PC 80 is connected with USB interface 62 (step S404: YES), CPU 11 may determine whether printer 60 has received print data from PC 80 via USB interface 62 (step S406). When printer 60 has not received the print data from PC 80 via USB interface 62 (step S406: NO), CPU 11 then may determine whether printer 60 has received a restore request from PC 80 (step S407). In the other embodiment, PC 80 may send one of the print data or restore request to printer 60. When printer 60 has not received the restore request (step S407: NO), CPU 11 repeatedly may determine whether printer 60 has received print data from PC 80 via USB interface 62 (step S406) until printer 60 has received the print data or a restore request.

When printer 60 has received the print data (step S406: YES), CPU 11 may direct printing portion 15 to print an image based on the received print data (step S408). After that, CPU 11 may restore the operating mode to the LAN mode (step S409). CPU 11 then may exit the printer-side, mode-switch printing process. When printer 60 has received the restore request (step S407: YES), CPU 11 may restore the operating mode to the LAN mode (step S409). CPU 11 then may exit the printer-side, mode-switch printing process.

A PC-side, mode-switch printing process according to the other embodiment now is described with reference to FIG. 8.

PC 80 repeatedly performs the PC-side, mode-switch printing process. When PC-side, mode-switch printing process begins, CPU 31 of PC 80 may determine whether PC 80 has accepted a mode-switch instruction through operating portion 37 (step S501). When PC 80 has not accepted the mode-switch instruction (step S501: NO), CPU 31 may exit the PC-side, mode-switch printing process.

When PC 80 has accepted the mode-switch instruction (step S501: YES), CPU 31 may determine whether printer 60 is connected with USB interface 81 of PC 80 (step S502). When printer 60 is not connected with USB interface 81 (step S502: NO), CPU 31 may display a message urging the user to connect printer 60 to USB interface 81 (step S503). CPU 31 repeatedly may determine whether printer 60 is connected with USB interface 81 (step S502) until CPU 31 determines that printer 60 is connected with USB interface 81 (step S502: YES).

When CPU 31 determines that printer 60 is connected with USB interface 81 and when printer 60 is set in the USB mode (step S502: YES), CPU 31 may determine whether PC 80 has sent print data to printer 60 (step S504). At this point, the user may specify image data to be printed and may input a print instruction or a restore instruction using operating portion 37. When PC 80 has received the print instruction, CPU 31 may generate print data based on the image data specified by the printer driver, as described herein, and PC 80 may send the print data to printer 60 via USB interface 81.

When PC 80 has sent the print data (step S504: YES), CPU 31 may exit the PC-side, mode-switch printing process. Therefore, printer 60 may print based on the print data as described herein, and printer 60 then may restore the settings of the LAN mode.

When PC 80 has not sent the print data to printer 60 and when CPU 31 has accepted the restore instruction (step S504: NO and S505: YES), CPU 31 may send a restore request to printer 60 (step S506), and CPU 31 may exit the PC-side, mode-switch printing process. Therefore, printer 60 may return to the LAN mode without printing. When CPU 31 has not accepted the restore instruction (step S505: NO), CPU 31 repeatedly may determine whether PC 80 has sent print data to printer 60 (step S504) until CPU 31 has accepted a print instruction or a restore instruction.

According to the other embodiment, printer 60 may be configured to receive print data by communicating directly with PC 80 after printer 60 switches the operating mode from the LAN mode to the USB mode, which may correspond to the mode-switch instruction which the user may input. After printer 60 has received the print data, printer 60 may switch the operating mode back to the LAN mode. This configuration may reduce a processing load in printer 60 and PC 80, as compared with a configuration in which one of printer 60 and PC 80 searches for a connection signal for communication in the USB mode during communication in the LAN mode.

In printer 60, printer 60 may switch the operating mode back to the LAN mode when PC 80 has received a restore instruction after printer 60 switches the operating mode to the USB mode. Therefore, printer 60 may switch the operating mode back to the LAN mode at a predetermined timing.

In the above-described embodiments of the invention, the wireless LAN, the wired LAN, and the USB may be used as the interfaces. Nevertheless, the invention is not limited to the specific embodiments thereof. The invention may be adapted to interfaces of various types, e.g., Bluetooth or IEEE1394. The printing device and the terminal device may comprise three or more interfaces each. The identifiers to be used may be appropriately changed in accordance with the interface type.

Although LAN interface 61 may used for the indirect communication in the other embodiment, printer 60 also may communicate directly with PC 80 using LAN interface 61. In this case, PC 80 may comprise a LAN interface, and printer 60 and PC 80 may directly connect with each other via a LAN cable.

In the embodiments of the invention, dialog box 40 may display the display data that printer 10 sends to PC 30. Nevertheless, the invention is not limited to the specific embodiment thereof. For example, dialog box 40 may display a message urging the user to send print data or a message indicating that a communication error may occur because the printer has not received the print data for a certain time period.

In the embodiments of the invention, the PC may send a restore request or a continuation request to the printer when the PC has not sent the print data within the predetermined time. Nevertheless, the PC may send the restore request or the continuation request at any time while the printing device and the PC have established a connection therebetween. The user may input the restore instruction or the continuation instruction through operating portion 18 of printer 10 and printer 10 may receive the restore request or the continuation request.

In the above-described embodiments, the first direct communication executing portion, the indirect communication executing portion, the switching portion, the transmission executing portion, the first accepting portion, and the receiving portion may be implemented by the same CPU. The second direct communication executing portion, the selecting portion, and the third accepting portion also may implemented by the same CPU. These portions also may be implemented by different CPUs, or by one or more application-specific integrated circuit or other circuits.

While the invention has been described in connection with various example structures and illustrative embodiments, it will be understood by those skilled in the art that other variations and modifications of the structures, configurations, and embodiments described above may be made without departing from the scope of the invention. For example, this application comprises any possible combination of the various features disclosed herein, and the particular features presented in the claims and disclosed above may be combined with each other in other ways within the scope of the application, such that the application should be recognized as also directed to other embodiments comprising any other possible combinations. Other structures, configurations, and embodiments will be apparent to those skilled in the art from a consideration of the specification or practice of the invention disclosed herein. It is intended that the specification and the described examples are illustrative with the true scope of the invention being defined by the following claims.

What is claimed is:

1. A printing device comprising:
a processor; and
a memory storing computer-readable instructions therein, the computer-readable instructions, when executed by the processor, causing the printing device to perform:
receiving a first instruction while a first wireless connection between the printing device and a relay device is established, the first wireless connection being a wireless connection between the printing device and the relay device such that the printing device communicates wirelessly with another device through the relay device;
in response to receiving the first instruction, disconnecting the first wireless connection between the printing device and the relay device;
after disconnecting the first wireless connection between the printing device and the relay device, establishing a second wireless connection between the printing device and a terminal device directly such that the printing device communicates wirelessly with the terminal device not through the relay device;
receiving wirelessly print data from the terminal device while the second wireless connection is established between the printing device and the terminal device;
in response to receiving the print data, controlling the printing device to print the images based on the print data;
after controlling the printing device to print the images, disconnecting the second wireless connection between the printing device and the terminal device; and
after disconnecting the second wireless connection, establishing the first wireless connection between the printing device and the relay device again.

2. The printing device according to claim 1, further comprising:
receiving the first instruction from a user at an input device of the printing device.

3. The printing device according to claim 1, further comprising:
an wireless interface;
wherein the computer-readable instructions, when executed by the processor, cause the printing device to further perform:
controlling the wireless interface to receive wirelessly the print data from the terminal device while the second wireless connection is established; and
controlling the wireless interface to communicate wirelessly with the relay device while the first wireless connection is established.

4. The printing device according to claim 1, wherein the computer-readable instructions, when executed by the processor, cause the printing device to further perform:
storing a first Internet Protocol address and a second Internet Protocol address in the memory, the first Internet Protocol address is included in a settings of the printing device while the first wireless connection is established, the second Internet Protocol address is included in the settings of the printing device while the second wireless connection is established; and
in response to receiving the first instruction, changing the setting of the printing device from the first Internet Protocol address to the second Internet Protocol address.

5. The printing device according to claim 1, wherein the computer-readable instructions, when executed by the processor, cause the printing device to further perform:
receiving a second instruction while the second wireless connection is established; and
in response to receiving the second instruction, establishing the first connection again.

6. The printing device according to claim 5, further comprising:
an input device configured to be used to input the second instruction by a user.

7. The printing device according to claim 5, wherein the computer-readable instructions, when executed by the processor, cause the printing device to further perform:
storing a first Internet Protocol address and a second Internet Protocol address in the memory, the first Internet Protocol address is included in a settings of the printing device while the first wireless connection is established, the second Internet Protocol address is included in the settings of the printing device while the second wireless connection is established;
in response to receiving the first instruction, changing the setting of the printing device from the first Internet Protocol address to the second Internet Protocol address; and
in response to receiving the second instruction, changing the setting of the printing device from the second Internet Protocol address to the first Internet Protocol address.

8. The printing device according to claim 1, wherein the computer-readable instructions, when executed by the processor, cause the printing device to further perform:
when a predetermined condition is satisfied after receiving the print data, establishing the first connection again.

9. The printing device according to claim 8, wherein
the predetermined condition is satisfied when a predetermined time passes after receiving the print data.

10. The printing device according to claim 9, wherein
the print data includes first print data and second print data, the second print data is received by the printing device after receiving the first print data;
the predetermined condition is satisfied when the predetermined time passes after receiving the first print data and before receiving the second print data; and
the predetermined condition is satisfied when the predetermined time passes after receiving the second print data.

11. The printing device according to claim 8, wherein the computer-readable instructions, when executed by the processor, cause the printing device to further perform:
storing a first Internet Protocol address and a second Internet Protocol address in the memory, the first Internet Protocol address is included in a settings of the printing device while the first wireless connection is established, the second Internet Protocol address is included in the settings of the printing device while the second wireless connection is established;

in response to receiving the first instruction, changing the setting of the printing device from the first Internet Protocol address to the second Internet Protocol address; and when the predetermined condition is satisfied, changing the setting of the printing device from the second Internet Protocol address to the first Internet Protocol address.

12. The printing device according to claim 1, wherein the computer-readable instructions, when executed by the processor, cause the printing device to further perform:

in response to receiving the first instruction, sending a beacon including at least one of a serviced set identifier and a Media Access Control address.

13. The printing device according to claim 12, wherein the computer-readable instructions, when executed by the processor, cause the printing device to further perform:

in response to sending the beacon, receiving a connection request including at least one of an authentication method and an encryption key.

14. The printing device according to claim 1, wherein the computer-readable instructions, when executed by the processor, cause the printing device to further perform:

when the printing device does not receive the print data within a predetermined time period, establishing the first connection again.

15. The printing device according to claim 14, wherein the computer-readable instructions, when executed by the processor, cause the printing device to further perform:

receiving a second instruction while the wireless connection is established; and in response to receiving the second instruction when the printing device does not receive the print data within the predetermined time period, communicating wirelessly with the relay device again.

16. The printing device according to claim 1, wherein the computer-readable instructions, when executed by the processor, cause the printing device to further perform:

while the second wireless connection is established and when the printing device does not receive the print data within a predetermined time period, transmitting display data to the terminal device.

17. The printing device according to claim 1, wherein the computer-readable instructions, when executed by the processor, cause the printing device to further perform:

in response to receiving the first instruction while the printing device currently is communicating the another device through the relay device, prohibiting the printing device from establishing the second wireless connection.

18. A non-transitory computer-readable recording medium which stores computer-readable instructions, the computer-readable instructions, when executed by a processor of a printing device, causing the printing device to perform:

receiving a first instruction while a first wireless connection between the printing device and a relay device is established, the first wireless connection being a wireless connection between the printing device and the relay device such that the printing device communicates wirelessly with another device through the relay device;

in response to receiving the first instruction, disconnecting the first wireless connection between the printing device and the relay device;

after disconnecting the first wireless connection between the printing device and the relay device, establishing a second wireless connection between the printing device and a terminal device directly such that the printing device communicates wirelessly with the terminal device not through the relay device;

receiving wirelessly print data from the terminal device while the second wireless connection is established between the printing device and the terminal device;

in response to receiving the print data, controlling the printing device to print images based on the print data;

after controlling the printing device to print the images, disconnecting the second wireless connection between the printing device and the terminal device; and after disconnecting the second wireless connection, establishing the first wireless connection between the printing device and the relay device again.

19. The printing device according to claim 1, wherein the computer-readable instructions, when executed by the processor, cause the printing device to further perform:

in response to receiving the first instruction, temporarily disconnecting the first wireless connection during at least a portion of a predetermined time period.

20. The printing device according to claim 1, wherein the computer-readable instructions, when executed by the processor, cause the printing device to further perform:

when the printing device does not receive the print data within the predetermined time period, disconnecting the second wireless connection between the printing device and the terminal device;

after disconnecting the second wireless connection, establishing the first connection again.

21. The printing device according to claim 20, wherein the computer-readable instructions, when executed by the processor, cause the printing device to establish the first wireless connection again after disconnecting the second wireless connection due to not receiving the print data within the predetermined time period, and without receiving a user instruction to establish the first wireless connection again.

22. The printing device according to claim 1, wherein the computer-readable instructions, when executed by the processor, cause the printing device to perform:

after disconnecting the second wireless connection, establishing the first wireless connection between the printing device and the relay device again without receiving a user instruction to establish the first wireless connection again.

* * * * *